Patented May 12, 1953

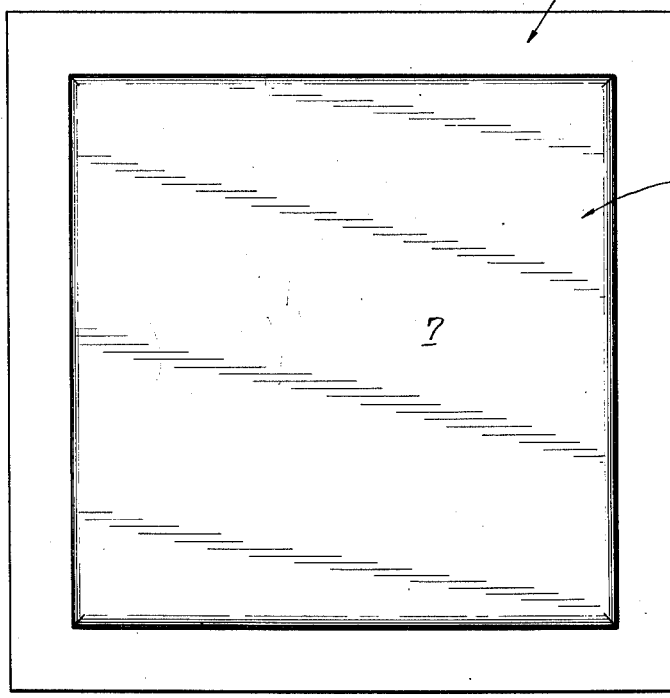
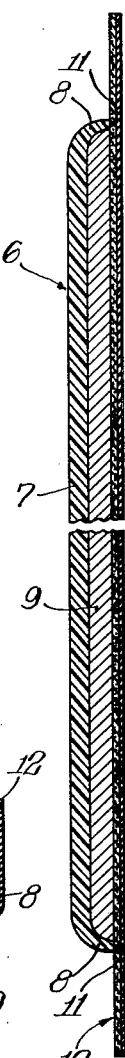
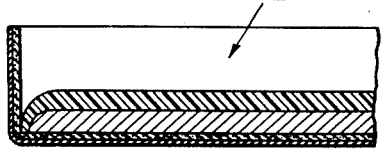
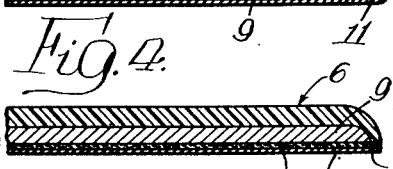
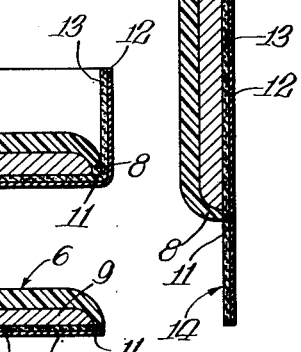
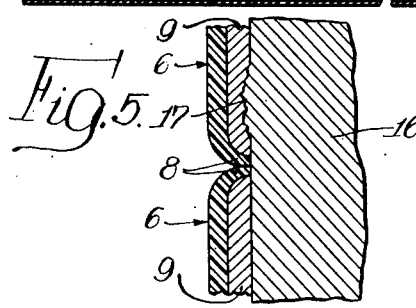

2,637,995

UNITED STATES PATENT OFFICE 2,637,995

SURFACE-COVERING TILE

Zelvern W. Mann, Chicago, Ill., assignor to The Meyercord Co., Chicago, Ill., a corporation of Illinois Application December 22, 1948, Serial No. 66,796

4 Claims. (Cl. 72—18)

This invention relates to improvements in surface-covering articles such as wall tiles, decorative plaques, and the like.

The application of various types of facing materials, such as wall or floor tile, has heretofore been accomplished by cementing to the surface of the wall or floor a large number of relatively small individual tiles formed of plastic, lightweight metal, or other suitable material. A special cement or mastic is ordinarily employed, the cement being supplied in separate containers independently of the tiles and being spread or smeared by hand over the surface to be decorated or on the backs of the individual tiles following which the tiles are pressed into position on the surface. As a result of the necessary handling of these sticky materials, such installations have generally been considered to be tedious, inconvenient, and not well adapted for home use by the amateur or average home owner unskilled in such techniques.

Accordingly, a primary object of my invention is to provide a surface-covering article, such as a wall tile or the like, which can be easily and satisfactorily installed by the average person without the need for special skill or long experience and which can be installed more quickly and more economically as compared with the older methods of tile application.

A further object of my invention is to provide a surface-covering article, such as a wall tile or the like, which can be applied to a surface without the necessity of utilizing a separate cement or mastic.

Another object of my invention is to provide a surface-covering article, such as a wall tile or the like, having the requisite amount of a suitable adhesive or bonding agent already applied thereto, thereby eliminating separate handling and application of a special adhesive during installation.

Still another object of my invention is to provide a surface-covering article, such as a wall tile or the like, which has applied to one side thereof a suitable quantity of a pressure-sensitive adhesive or mastic which retains its normally tacky condition for long periods of time thereby permitting the article to be applied to a surface merely by pressing the adhesive-covered side thereof into close contact with the surface to be decorated.

An additional object of the invention is to provide a substantially flat surface-covering article, such as a wall tile or the like, which has one side thereof covered with a suitable slow-drying pressure-sensitive adhesive, said adhesive being provided with removable protecting means to preserve its adhesive properties during non-use of the article, but said protecting means being readily removable to expose said adhesive when it is desired to apply the article to a surface.

Other objects and advantages of my invention will become apparent from the subsequent detailed description of the invention and the accompanying drawing, in which:

Fig. 1 is a plan view of a wall tile embodying the novel features of my invention and showing a tile member disposed on an underlying sealing or protective sheet;

Fig. 2 is a cross-sectional view taken along the line 2—2 of Fig. 1, the relative thicknesses of the several layers being exaggerated for the sake of clarity;

Fig. 3 is a cross-sectional view of a wall tile similar to Fig. 2 but showing the marginal edges of the sealing sheet in creased or up-turned position;

Fig. 4 is a cross-sectional view of a slightly different embodiment in which the sealing or protective sheet is substantially coextensive with the tile member; and Fig. 5 is a fragmentary cross-sectional view of a wall having applied thereto a plurality of tiles of the type described herein.

Briefly, the improved wall tile unit or similar surface-covering article of my invention comprises a laminar structure in which the outermost layer is a generally flat semi-rigid surface-covering member, such as a plastic tile. Disposed on the inner surface of this member is a relatively thick stratum or layer of a normally tacky mastic or pressure-sensitive adhesive material adapted to permanently bond the tile member to a surface. A removable sealing or protective sheet is disposed over the exposed surface of the adhesive layer to protect the same prior to application of the tile to a surface. As will be described hereinafter in detail, the tile member is preferably formed with inturned lips adjacent its edges in order to retain or hold the relatively thick adhesive stratum on the tile and to permit sealing engagement of the protective sheet with the peripheral edges of the tile member. As will also appear hereinafter, the protective or sealing sheet is preferably in the form of a decalcomania backing paper having a water soluble gum or adhesive coating thereby permitting the sealing sheet to be readily released from the tile merely by wetting.

Referring now to the drawing, Figs. 1, 2, and 3 illustrate, merely by way of example, one form of my invention comprising a decorative or colored tile of the type adapted particularly for use on bathroom or kitchen walls or other similar surfaces. As seen in Fig. 2, the article comprises a rectangular tile member 6 having a substantially flat central or body portion 7 and having its outermost edges bent away from the plane of the body portion 7 to define a rim comprising a plurality of connected peripheral retaining lips 8 along the four sides of the tile. The tile member 6 may be formed from a suitable relatively light-weight material, such as plastic, lightweight metal, stiff enameled paper, and other compositions capable of being formed into relatively rigid or semi-rigid sheets. I have found that certain of the well known synthetic plastics containing resins of the thermosetting or thermoplastic type are particularly useful, e. g. polystyrene, urea-formaldehyde, etc.

As a result of the peripheral retaining lips 8, the tile member 6 constitutes in effect a shallow tray-like receptacle. The body portion 7 within the surrounding retaining rim or lip portions 8 is filled with a relatively thick layer 9 of a suitable adhesive composition or bonding agent which will ultimately serve to permanently secure the tile member 6 to a surface. This adhesive composition, commonly referred to as a mastic, should be of the plastic, pressure-sensitive, normally-tacky, and preferably water insoluble type. In addition, the adhesive composition forming the layer 9 should be of a relatively slow drying or slow setting type which will retain its pressure-sensitive and normally-tacky characteristics for relatively long periods of time. In order to insure the slow drying property of the adhesive composition or mastic, I prefer to employ a material containing as one of its principal ingredients a relatively slow-drying drying oil, e. g. of the fatty acid glyceride type, along with a filler. An adhesive composition which meets the foregoing requirements may be formed by compositing castor oil with whiting (calcium carbonate) and bleached white rosin, as fillers, in the proportions of 8 ounces of castor oil to 8 pounds of whiting and 4 pounds of rosin. The viscosity or fluidity of the adhesive may be regulated by varying the amount of castor oil relative to the filler.

In order to obtain a strong bond between the tile member 6 and the surface to which it is applied, the adhesive stratum or layer 9 should be relatively thick and in most cases the entire depth of the tile enclosed by the peripheral lip portions 8 will be filled with adhesive to the outermost extremities or edges 11 of the lip portions 8. By the term "relatively thick" I mean a thickness many times greater than the order of thickness of the adhesive layer in an ordinary pressure-sensitive type decalcomania or in the well known forms of adhesive tape and transparent cellulose tape. For example, a wall tile unit which I have found to be satisfactory has an adhesive layer 9 about .05 inch thick with the flat central portion of the tile member 6 also about .05 inch thick. The thickness of the layer 9 is important because of the semi-rigid nature of the tile member 6 which renders it incapable of conforming to slight surface irregularities when the tile member is applied to a wall or other surface. By employing a relatively large quantity of adhesive in the layer 9, the adhesive stratum itself conforms to and compensates for surface irregularities, thereby eliminating the necessity of smoothing off such surface, and at the same time insures the existence of a strong ultimate bond capable of supporting the weight of the tile member 6 in any position.

Prior to use of the article, the adhesive or mastic stratum 9 is protected by means of a sealing or protective sheet comprising preferably a rectangular sheet of paper 12 having applied to one side thereof a coating 13 of a water soluble gum or adhesive, e. g. dextrine. The water soluble coating 13 is disposed directly against the adhesive stratum 9, and the sheet 12 is preferably in peripheral sealing engagement with the outermost linear edges 11 of the rim or lip portions 8 thereby completely protecting the adhesive layer 9. The paper sheet 12 having a coating 13 may be of a standard type known as simplex paper and commonly used as a releasable backing or support for decalcomanias. The sheet 12 is readily releasable from the tile member 6 and its adhesive layer 9 merely by immersing or otherwise wetting the paper 12 to soften or dissolve the water soluble coating 13.

Thus, it will be seen that the protective or sealing sheet 12 serves two purposes. During storage, packaging, and handling of the individual tiles, the sealing sheet 12 permits the tiles to be stacked without adhering to one another and also protects the user from unnecessary contact with the sticky adhesive composition. Furthermore, by protecting the mastic layer 9 from the atmosphere, the tile structure may be stored for relatively long periods of time, for example, on a dealer's shelf, without the adhesive drying out and becoming ineffective. Although I prefer to employ as the sealing sheet a paper of the decalcomania backing type having a water soluble gum thereon and which is releasable merely by wetting, nevertheless, other suitable forms of sealing means may be employed.

As will be seen in Figs. 1, 2, and 3, the sealing sheet 12 is preferably of greater size than the tile member 6 thereby providing an extending marginal portion 14 around the tile member 6. Thus, if slippage or displacement should occur between the tile 6 and the sheet 12, there is no danger of the mastic layer 9 being partially exposed to the air. If desired, the marginal portion 14 may be creased and turned up around the sides of the tile member 6, as shown in Fig. 3, thereby minimizing any danger of slippage of the tile member 6 on the sealing sheet 12 and also serving further to protect the adhesive layer 9. Packaging of the individual articles is also facilitated by turning up the marginal edges 14 of the sealing sheet 12 since in this condition the articles may readily be stacked or nested. The provision of the marginal portions 14 also facilitates handling of the tile and assists in the easy removal of the sealing sheet preparatory to application of the tile to a wall surface. The marginal portion 14 may extend to any desired extent from the tile member 6, e. g. from 1/8 to 1/2 inch. With square tile members having a side dimension of about 4 inches, I have found that a marginal extension of about 1/2 inch is particularly satisfactory although, of course, this could be made greater or smaller as desired.

In Fig. 4, I have shown a modified form of the invention in which the sealing sheet 12 having the water soluble coating 13 is merely coextensive in size with the tile member 6 thereby eliminating the marginal portions 14 shown in Figs. 1, 2, and 3. This form of the invention may be preferred in certain cases although it entails a relatively precise cutting operation and accurate registry of the protective sheet 12 with the tile member 6 which is not necessary when the marginal portions 14 are provided. In this embodiment of the invention it is likewise preferred to have the edges of the sheet 12 in sealing engagement with the edges 11 of the lip portions 8.

In the application of the surface-covering articles of my invention, the protective sheet 12 may be released from the tile member 6 by submerging the entire article in water for a few seconds after which the paper sheet 12 may be readily slid or stripped off thereby exposing the pressure-sensitive adhesive stratum 9. As previously mentioned, the mastic comprising the layer 9 should be water insoluble so that it will not be affected during removal of the sheet 12 by wetting. It will usually be desirable to give the exposed adhesive layer an additional water rinse in order to remove any remaining water soluble gum. As illustrated in Fig. 5, the tile member 6 may then be applied in the desired location on a wall 16 merely by pressing the exposed adhesive covered side of the tile firmly into place against the wall surface. The relatively thick mastic layer will readily conform to any minor surface irregularities, such as shown in an exaggerated degree at 17, and will ultimately dry to form a strong permanent bond. I have observed that, when tile members of plastic composition are employed, pressure may be applied flatwise to the central or body portion 7 of the tile member 6 to depress the same slightly and upon release thereof a vacuum-like condition is created between the tile member 6 and the wall 16 thereby further serving to secure the tile member 6 to the wall surface. As seen in Fig. 5, the individual tile members 6 may be applied one at a time with the lip portions 8 in abutting relation to form a continuous tiled surface over the wall 16.

When it is necessary to install the individual tile members around pipes, sinks, tubs, etc., the necessary fitting may be readily accomplished by cutting the tile with a saw or shears prior to the removal of the protective sheet 12. In this manner the presence of the adhesive layer 9 does not interfere with the shaping or fitting operation nor does the adhesive smear or run out. The protective sheet 12 holds the adhesive layer 9 in place during the cutting operation so that a section may be cleanly cut away.

From the foregoing, it is apparent that the wall tile unit comprising the present invention possesses great benefits and advantages, particularly to the average home owner. The messy and tedius application of a separate adhesive compound from a separate container to a wall surface requiring the use of special applicators, has been eliminated. A home owner by such old method was forced to work long hours in order to complete a job or at least one entire wall section inasmuch as the adhesive compound which had been smeared on the wall would dry and become unworkable unless tile sections were applied in a relatively short time. Furthermore, once opened, the adhesive compound in the container tended to dry out unless used promptly or carefully sealed. With the structure of the present invention, a home owner may merely remove all at once the backings from as many tile units as he may care to apply at any one session of work or as many as he may have time to apply. He need not complete the job at any one time but it may be done in a somewhat leisurely fashion. Moreover, because the separate application of adhesive has been eliminated, the tiles may be applied quite quickly and cleanly and, in fact, a whole bathroom or a large wall section may be covered in a relatively short time with much improved results over the old methods.

Although I have shown individual tile members of relatively small size, it is within the scope of my invention to form relatively large tile sections in this manner. Also, I may provide tile sheets marked to simulate a block of four or more tile members, a single protective sheet 12 being employed for the entire block. Furthermore, although the tile members 6 will usually be provided in the form of rectangular or square units as shown, my invention contemplates surface-covering articles of any desired configuration.

The invention has been described with particular emphasis on a wall tile, but it will be apparent that the principles of the invention are equally applicable to any type of generally flat surface-covering article. For example, advertising signs or plaques may be prepared in this manner and employed for display purposes on windows, showcases, etc. The surface-covering member may comprise any desired form of display or decoration containing printed matter, pictorial representations, or artistic designs as well as the tile or simulated tile discussed in greater detail herein. It will also be understood that various other modifications and equivalents may be substituted within the scope of the invention as defined in the appended claims.

I claim:

1. An article of the class described comprising a semi-rigid tile member having a generally flat body portion and lip portions adjacent the peripheral edges thereof turned outwardly from the plane of said body portion to define an adhesive-receiving recess on one side of said member, a layer of a normally-tacky pressure-sensitive adhesive material disposed in said recess, said layer of adhesive material being peripherally enclosed and substantially isolated by said lip portions and said recess being filled by said adhesive material substantially to the outer extremities of said lip portions, and a removable sealing sheet disposed over said adhesive layer in sealing engagement with said lip portions around the entire periphery of said member whereby said adhesive layer is completely enclosed for maintaining its normally tacky and pressure-sensitive condition during non-use of the article, said sheet being releasable from said adhesive layer and said lip portions to expose the same for adhering said member to a surface without requiring the use of additional adhesive material.

2. The article of claim 1 further characterized in that said sealing sheet is provided with a water soluble coating on the side adjacent said adhesive layer whereby said sheet may be released by wetting with water.

3. An article of the class described comprising a generally flat semi-rigid tile member having rearwardly extending peripheral lips defining an adhesive-receiving recess at the back of the tile member, a layer of a water insoluble pressure-sensitive adhesive disposed in said recess, said adhesive layer being peripherally enclosed and substantially isolated by said lips and said recess being filled by said adhesive substantially to the outer extremities of said lips, and a protective paper sheet having a water soluble gum coating thereon disposed over the back of said tile member with the gum coated side of the paper adjacent said adhesive and in sealing engagement with said lips around the entire periphery of the tile member whereby to enclose and protect said adhesive for maintaining its pressure sensitive condition during non-use of the article, said protective sheet being readily releasable from the article upon wetting with water whereby to expose said adhesive for adhering the tile member to a surface without requiring the use of additional adhesive.

4. The article of claim 1 further characterized in that said sealing sheet is larger than said tile member whereby to provide an extended marginal portion around the periphery of said member for facilitating handling of the article.

ZELVERN W. MANN.

References Cited in the file of this patent

UNITED STATES PATENTS

| Number | Name | Date |
|---|---|---|
| 1,881,438 | Fischer | Oct. 11, 1932 |
| 1,990,701 | Knight | Feb. 12, 1935 |
| 2,145,068 | Batcheller | Jan. 24, 1939 |
| 2,156,149 | Feichter | Apr. 25, 1939 |
| 2,173,622 | Crooks et al. | Sept. 19, 1939 |
| 2,304,787 | Avery | Dec. 15, 1942 |
| 2,326,581 | Van Cleef | Aug. 10, 1943 |
| 2,381,605 | Leander | Aug. 7, 1945 |
| 2,383,884 | Palmquist | Aug. 28, 1945 |

FOREIGN PATENTS

| Number | Country | Date |
|---|---|---|
| 438,599 | Great Britain | 1935 |
| 456,471 | Great Britain | of 1936 |